(12) United States Patent
Griffiths et al.

(10) Patent No.: US 12,018,769 B2
(45) Date of Patent: Jun. 25, 2024

(54) DIAPHRAGM VALVE

(71) Applicant: KOHLER MIRA LIMITED, Cheltenham (GB)

(72) Inventors: Daniel Paul Griffiths, Cheltenham (GB); Benjamin Lea, Cheltenham (GB); Mitchell Connor Hobbs, Gloucester (GB)

(73) Assignee: KOHLER MIRA LIMITED, Cheltenham (GB)

( * ) Notice: Subject to any disclaimer, the term of this patent is extended or adjusted under 35 U.S.C. 154(b) by 0 days.

(21) Appl. No.: 17/846,298

(22) Filed: Jun. 22, 2022

(65) Prior Publication Data

US 2022/0325818 A1   Oct. 13, 2022

Related U.S. Application Data

(63) Continuation of application No. PCT/GB2020/053086, filed on Dec. 2, 2020.

(30) Foreign Application Priority Data

Jan. 9, 2020 (GB) ...................................... 2000283

(51) Int. Cl.
*F16K 31/385* (2006.01)
*F16K 7/16* (2006.01)

(52) U.S. Cl.
CPC ............ *F16K 31/3855* (2013.01); *F16K 7/16* (2013.01); *E03C 2201/30* (2013.01)

(58) Field of Classification Search
CPC ........ F16K 31/3855; F16K 7/16; F16K 31/62; E03C 2201/30
See application file for complete search history.

(56) References Cited

U.S. PATENT DOCUMENTS

| 3,563,468 A | 2/1971 | Holzinger |
| 3,955,791 A * | 5/1976 | Meckstroth ......... F16K 31/3855 251/38 |

(Continued)

FOREIGN PATENT DOCUMENTS

| DE | 102012221047 A1 | 5/2014 |
| GB | 2432201 A | 5/2007 |

(Continued)

OTHER PUBLICATIONS

Patents Act 1977: Search Report under Section 17 for GB2000283.8, dated May 5, 2020, 1 page.

(Continued)

*Primary Examiner* — Daphne M Barry
(74) *Attorney, Agent, or Firm* — Husch Blackwell LLP

(57) ABSTRACT

A diaphragm valve is provided, and includes a diaphragm moveable over a range from a first position to a second position, to open and close an outlet. A control bleed hole extends from a first side of the diaphragm to a second side, opposite the first side. A closing member is moveable to open and close the control bleed hole, to modify the pressure on either side of the diaphragm, and to cause the movement the diaphragm over at least part of the range. A mechanical means is arranged to move the closing member to open and close the control bleed hole. The mechanical means is configured to engage the diaphragm and cause movement of the diaphragm over at least part of the range.

20 Claims, 8 Drawing Sheets

(56) References Cited

U.S. PATENT DOCUMENTS

| | | | |
|---|---|---|---|
| 4,662,399 A | | 5/1987 | Buchner et al. |
| 4,847,924 A | * | 7/1989 | Samaniego ............... E03D 5/09 4/249 |
| 4,995,585 A | | 2/1991 | Gruber et al. |
| 5,363,873 A | | 11/1994 | Richmond |
| 5,915,665 A | | 6/1999 | Paese et al. |
| 5,954,311 A | * | 9/1999 | Thorpe ................. F16K 31/404 251/38 |
| 6,260,574 B1 | * | 7/2001 | Nichols-Roy ....... F16K 31/3855 137/550 |
| 6,845,960 B2 | * | 1/2005 | Shin ........................ F16K 31/62 251/28 |
| 2017/0343127 A1 | | 11/2017 | Bian et al. |
| 2017/0343130 A1 | | 11/2017 | Gonzalez |

FOREIGN PATENT DOCUMENTS

| | | |
|---|---|---|
| JP | 06094145 A | 4/1994 |
| JP | 2000034762 A | 2/2000 |
| WO | 0046535 A1 | 8/2000 |

OTHER PUBLICATIONS

International Search Report for PCT/GB2020/053086, dated Mar. 15, 2021, 4 pages.
European Office Action dated Jun. 12, 2023, issued in corresponding European Application.

\* cited by examiner

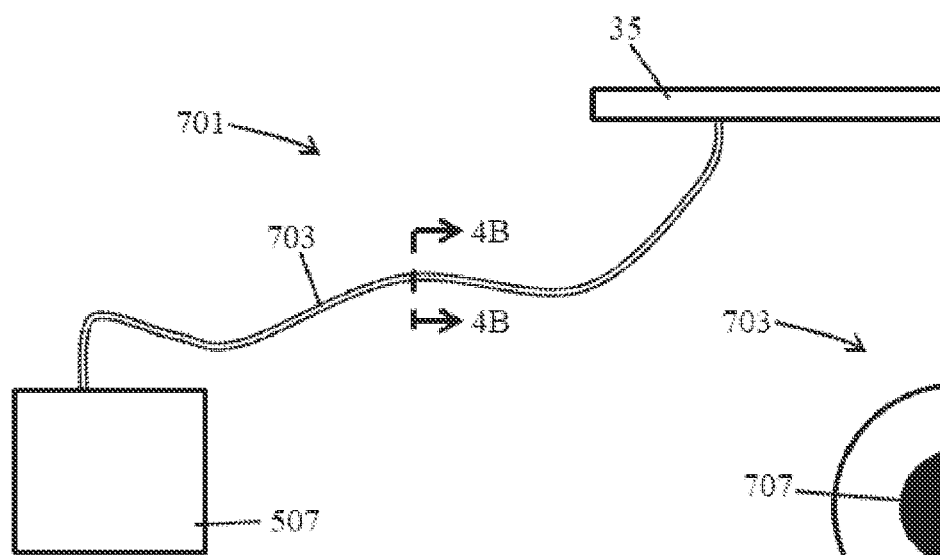
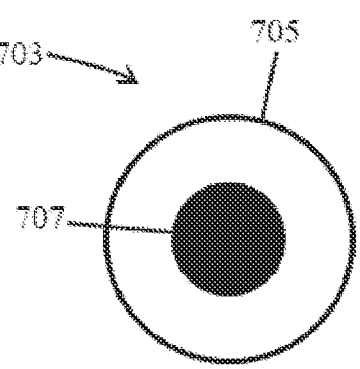
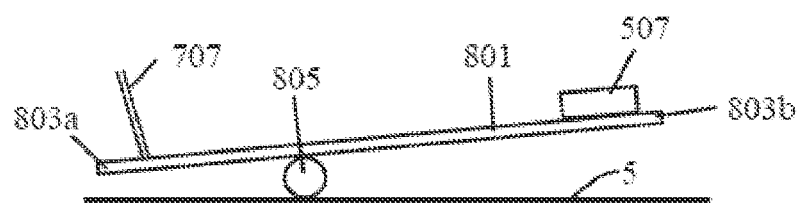

DIAPHRAGM VALVE

CROSS REFERENCE

This application is a continuation of and claims priority to PCT Application No. PCT/GB2020/053086, filed Dec. 2, 2020, which itself claims priority to Great Britain Patent Application No. 2000283.8, filed Jan. 9, 2019, the entireties of both of which are hereby incorporated by reference.

FIELD OF THE INVENTION

The present disclosure relates to a diaphragm valve. In particular, but not exclusively, the present disclosure relates to a diaphragm valve for use in an ablutionary fitting. The present disclosure also relates to an ablutionary fitting comprising a diaphragm valve.

BRIEF DESCRIPTION OF THE DRAWINGS

Embodiment of the invention will now be described, by way of example only, with reference to the accompanying drawings, in which:

FIG. 4A illustrates an example actuator mechanism for controlling the diaphragm valve module of FIG. 2A.

FIG. 4B illustrates the actuator member of FIG. 4A in more detail.

FIG. 4C illustrates a link member for transferring force from the actuator mechanism of FIG. 4A to the diaphragm valve module of FIG. 2A.

Figure 1A:
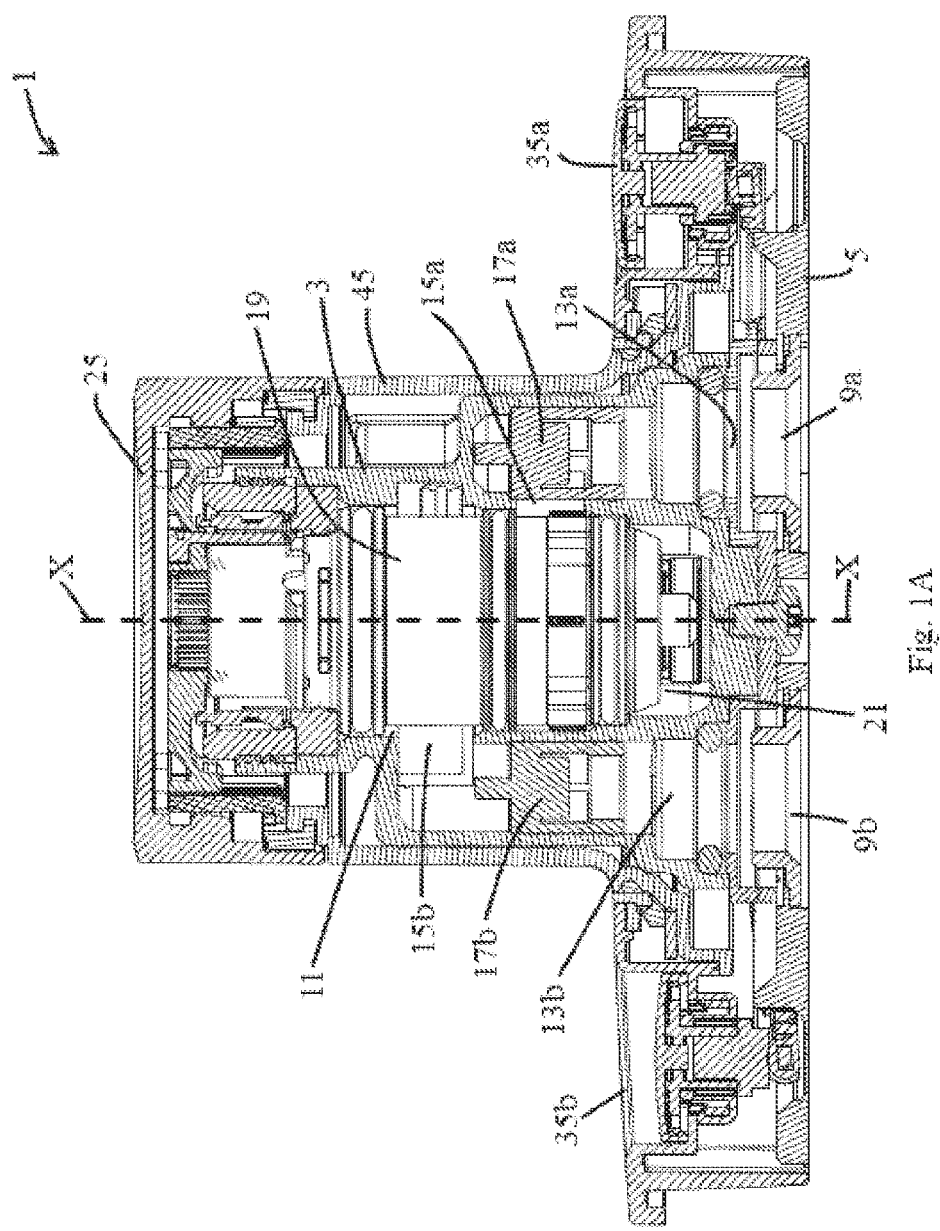
FIG. 1A schematically illustrates a shower fitting in a cut-through view.

Ablutionary fittings, such as showers, often include multiple outlet ports, each feeding a different outlet device. For example, a first outlet device may comprise an overhead showerhead, and a second outlet device may comprise a handheld unit.

Different types of diverter valves are known, which allow one or more of the outlet devices to be selected at a time. In other examples, each outlet may include a separate valve to separately control the flow of water to each device.

Opening and closing valves that control water flow typically requires overcoming a water pressure, which can vary between 0.1 and 10 bar in the case of a mains water supply, with 3 bar being typical. The magnitude and direction of the force required to open the valves can reduce the design freedom when positioning the control means in relation to the valves. Often, the control means must be located along a straight line from the actuator of the valve to allow transmission of the required force by a rigid connection mechanism.

It would be beneficial to mitigate or at least reduce one or more of the problems associated with the prior art.

According to a first aspect of the invention, there is provided a diaphragm valve comprising: a diaphragm moveable over a range from a first position to a second position, to open and close an outlet; a control bleed hole extending from a first side of the diaphragm to a second side, opposite the first side; a closing member moveable to open and close the control bleed hole, to modify the pressure on either side of the diaphragm, to cause the movement the diaphragm over at least part of the range; and mechanical means arranged to move the closing member to open and close the control bleed hole, wherein the mechanical means is configured to engage the diaphragm and cause movement of the diaphragm over at least part of the range. In one example embodiment, the diaphragm valve may be closed when the diaphragm is in the first position, and open when the diaphragm is in the second position.

The diaphragm valve can be actuated by a low force input (≤10 Newtons), providing greater flexibility in the design and positioning of a user control device used to actuate the valve.

The mechanical means may be arranged to engage the diaphragm after moving the closing member to open or close the control bleed hole.

Over at least part of the range, movement of the diaphragm may be driven by a combination of the mechanical means and the pressure difference.

The control bleed hole may be formed as an aperture in the diaphragm. Optionally, the aperture may be formed centrally in the diaphragm.

The diaphragm valve may comprise an inlet and an outlet fluidly isolated from the inlet when the diaphragm is in the first position. Optionally, the inlet and outlet may both be on the first side of the diaphragm.

The diaphragm may comprise one or more additional bleed holes extending through the diaphragm, separate from the control bleed hole. Optionally, the one or more additional bleed holes may be in fluid communication with the inlet and fluidly isolated from the outlet when the diaphragm is in the first position, such that a bleed path is formed when the control bleed hole is open. The bleed path may extend from the inlet, through the additional bleed holes to the second side of the diaphragm, and from the second side of the diaphragm to the outlet through the control bleed hole.

The diaphragm valve may comprise anti-clogging means to prevent blockages forming in the additional bleed holes.

The inlet and outlet may be in direct fluid communication when the diaphragm is in the second position, providing a flow path from the inlet to the outlet.

The closing member may be biased to close the control bleed hole.

The mechanical means may include: means for converting a pushing and/or pulling force from an actuator mechanism to a movement of the closing member.

The closing member may be arranged to move along a linear direction. The mechanical means may optionally be arranged to convert rotation of the mechanical means to linear movement of the closing member.

The mechanical means may be arranged to convert a linear movement of the actuator mechanism to rotation of the mechanical means.

The mechanical means may be arranged to rotate about an axis perpendicular to the linear direction.

The actuator mechanism may be arranged to translate an input force at a user control device to a movement of the actuator mechanism along its length.

Preferably, the mechanical means may include: a rotatable elongate member having an axis extending perpendicular to the first linear direction; a first formation on the elongate member arranged to engage the actuator mechanism and arranged to convert linear movement of the actuator mechanism to rotation of the elongate member; and a second formation arranged to engage the closing member convert rotation of the elongate member to linear movement of the closing member. The diaphragm may be arranged to move along the linear direction.

The actuator mechanism may comprise; a cable or flexible tube coupled between the user control device and the mechanical means; and a sheath at least partially encasing and guiding the cable or flexible tube. The cable or flexible tube may be moveable relative to the sheath in a direction along the length of the cable or flexible tube and a pushing or pulling force from either end of the cable or flexible tube is translated along the length of the cable or flexible tube.

The diaphragm valve may further include latching means arranged to hold the diaphragm in the first and/or second position. Optionally the latching means may be provided at one or more of the user control device, the actuator mechanism, the mechanical means, the closing member or the diaphragm.

The diaphragm valve may comprise a housing defining a volume at least partially receiving the diaphragm, the closing member and the mechanical means. The use of a separate housing that encases only the components of the diaphragm valve allows the diaphragm valve to be provided as a modular component for inclusion in larger systems.

The housing may define a seat defining the first and/or second position of the diaphragm.

The diaphragm may close the volume, to form an enclosed space on the second side of the diaphragm. Optionally, the bleed path passes through the enclosed space.

The diaphragm valve may comprise a retaining ring to retain the diaphragm at least partially within the chamber, and to at least partially define the first and/or second positon of the diaphragm.

The elongate member of the mechanical means may extend through the housing. Optionally, the first formation of the mechanical means may be outside the housing. Further optionally, the second formation of the mechanical means may be inside the housing.

According to a second aspect of the invention, there is provided an ablutionary fitting comprising: a body; one or more inlets; and one or more outlets, at least one of the one or more outlets having a diaphragm valve according to the first aspect, arranged to open and close the outlet.

By using the low force diaphragm valve of the first aspect in an ablutionary fitting, the ablutionary fitting can make use of low force user control devices, and has greater freedom on where to position the user control devices used to actuate the valve(s), and the design of the user control devices.

The ablutionary fitting may comprise: two or more inlets; a mixer cartridge received in the body and arranged to mix water from the two or more inlets, the mixer cartridge may be located between the inlet and the one or more outlet.

The body may comprise internal formations defining the inlet of the diaphragm valve and the outlet of the diaphragm valve.

The ablutionary fitting may have a number of outlets connected to different devices. Each outlet may be opened and closed by any one of the diaphragm valves.

It will be appreciated that features discussed in relation to any particular aspect may be applied to any other aspect, where appropriate.

DETAILED DESCRIPTION OF THE INVENTION

Figure 1B:
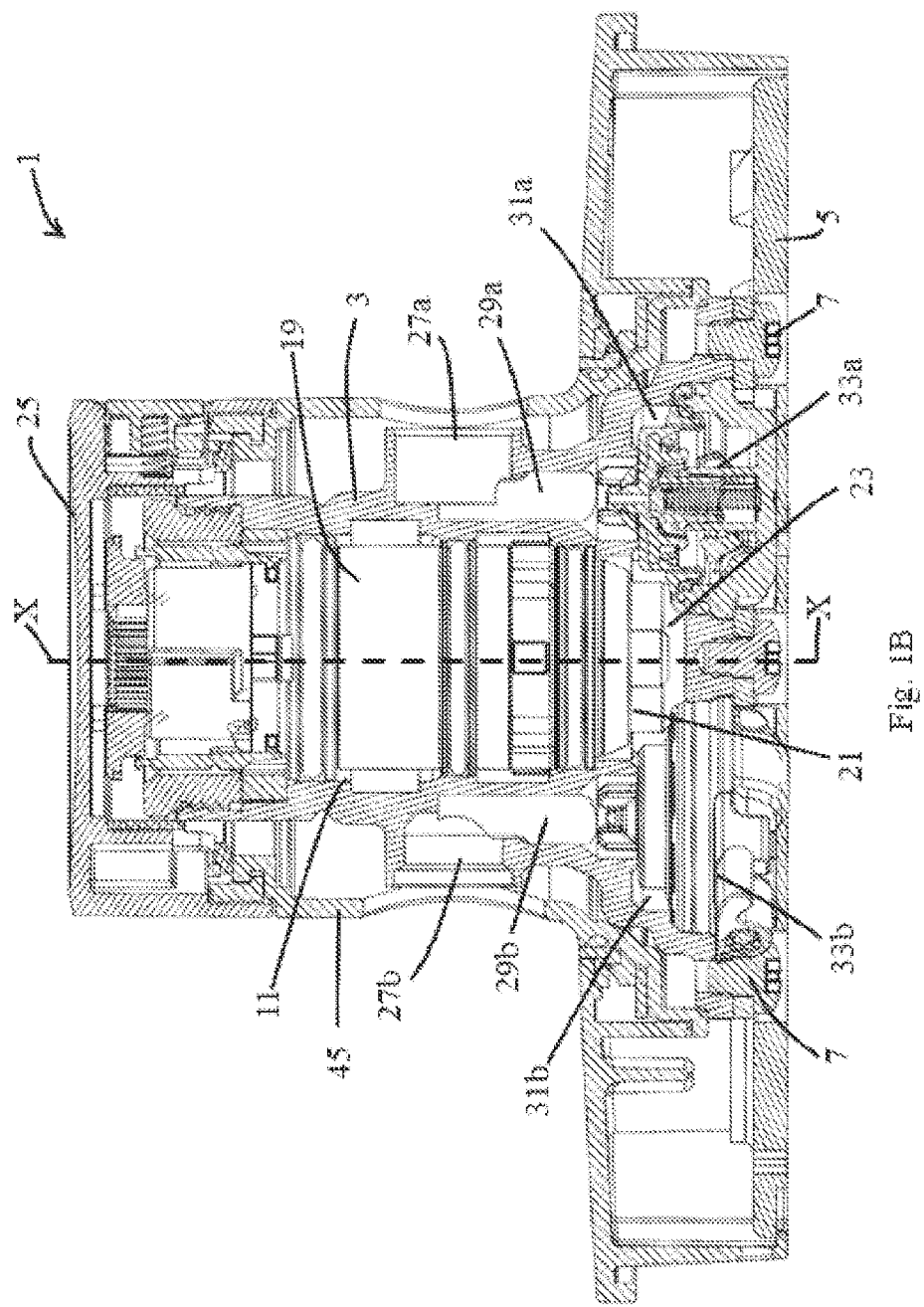
FIG. 1B schematically illustrates the shower fitting of FIG. 1A, in cut through view perpendicular to the view of FIG. 1A.

FIGS. 1A and 1B illustrate an example of a mixer shower fitting 1, which is used as an example to illustrate various embodiments. FIGS. 1A and 1B illustrate the fitting 1 in sectional view. The two views of FIGS. 1A and 1B are taken at 90 degrees to each other.

The shower fitting 1 has a substantially cylindrical body 3 formed by a cylindrical housing defining a longitudinal axis X-X. The body 3 is secured to a mounting plate 5, which in turn is fitted to a wall or other support surface (not shown). Thus, in use, the axis X-X projects out of the wall or surface. A cover trim 45 is then fitted over the body 3 and plate 5. The cover trim 45 may be secured to the plate 5 and/or body 3 by interengaging projections, screws, or any other suitable connecting means (not shown).

In the below, reference will be made to the top/front and bottom/rear of the fitting 1 and various components of the fitting 1. These terms are defined along the axis X-X, with respect to the plate 5. Therefore, the "bottom", "base" or "rear" of an element is the end closest to the plate 5, whilst the "top" or "front" is the opposing end, spaced from the plate 5. The upwards/downwards and forwards/backwards directions will also be defined along this axis X-X with upwards/forwards being along the axis X-X away from the plate 5 and down/backwards being along the axis X-X towards the plate 5.

In one example, the body 3 is secured to the mounting plate 5 by screws 7, however it will be appreciated that this is by way of example only, and various mechanisms for securing the body 3 to the plate 5 will be understood by the person skilled in the art. For example, any suitable mechanical fixing may be used, or interengaging projections may be used.

As shown in FIG. 1A, the body 3 and plate 5 define a pair of inlets 9*a,b* for connecting to water supply pipes (not shown). In this example, a first inlet 9*a* is arranged to connect to a hot water supply, and the second inlet 9*b*, is connected to a cold water supply.

Each of the body inlets 9*a,b* is coupled to a respective inlet passage 13*a,b* defined in the housing, which in turn has an opening 15*a,b* into an inner chamber 11 defined in the housing. The inlet passages 13*a,b* extend along the axis X-X.

The chamber 11 defines an open space within the body 3. A thermostatic mixer cartridge 19 is received in the chamber 11 to mix the hot and cold water. The cartridge 19 interacts with the body 3 to divide the chamber 11 into a number of sub-portions, and has hot and cold inlets (not shown) axially aligned with the respective chamber openings 15*a,b*, to receive water from the body inlets 9*a,b*.

The thermostatic mixer cartridge 19 extends along the axis X-X and has a single outlet 21 for mixed water at its base. The body 3 defines an outlet chamber 23 into which the outlet 21 opens. A control 25 is provided to control the mixing of the water, to vary the temperature at the outlet 21.

The chamber openings 15*a,b* are controlled by check valves 17*a,b*, which are biased to close the chamber openings 15*a,b*. Under sufficient water pressure, the check valves 17*a,b* open, to permit passage of water into the cartridge 19, through sub-portions of the chamber 11. In one example, the check valves 17*a,b* may open with a pressure of 0.025 bar or more.

The check valves 17*a,b*, thermostatic mixer cartridges 19 and controls 25 are known in the art.

As best shown in FIG. 1B, the body 3 defines a pair of outlet openings 27a,b. Each outlet opening 27a,b provides mixed water from the mixer cartridge 19, and may be connected to a different output device (not shown). For example, a first outlet 27a may connect to an overhead showerhead, and a second outlet 27b may connect to a handheld unit.

Each outlet opening 27a,b is connected to the outlet chamber 23 by a respective outlet passage 29a,b defined in the housing 3.

The outlet passages 29a,b extend parallel to the axis X-X, with water flowing in a direction away from the base 5. Thus, the outlet openings 27a,b are arranged on the side of the body 3.

Within each outlet passage 29a,b, a valve chamber 31a,b is formed. The valve chambers 31a,b receive a respective diaphragm valve module 33a,b (also referred to herein as valves), to control the flow to the outlets 27a,b. In FIG. 1B, a first valve module 33a (on the right hand side of the Figure) is shown in cut-through for illustrative purposes.

User control devices 35a,b, formed in the trim 45, are provided to control the valve module 33a,b. Actuation of the user control devices 35a,b causes actuation of the diaphragm valve modules 33a,b to control flow of water from the outlets 27a,b.

The diaphragm valve module 33a,b and user control devices 35a,b will be discussed in more detail below.

As shown by FIGS. 1A and 1B, water enters the body 3 through the inlets 9a,b and flows in a forward direction through the inlet passages 13a,b. It then enters the thermostatic mixer cartridge 19, and flows rearward through the cartridge 19. At the valve modules, 33a,b, the flow again turns through 180 degrees, and flows forward through the outlet passages 29a,b, to the outlets 27a,b.

The diaphragm valve module 33 will now be discussed in more detail with reference to FIGS. 2A, 2B, 2C, 2D and 3.

Figure 2A:
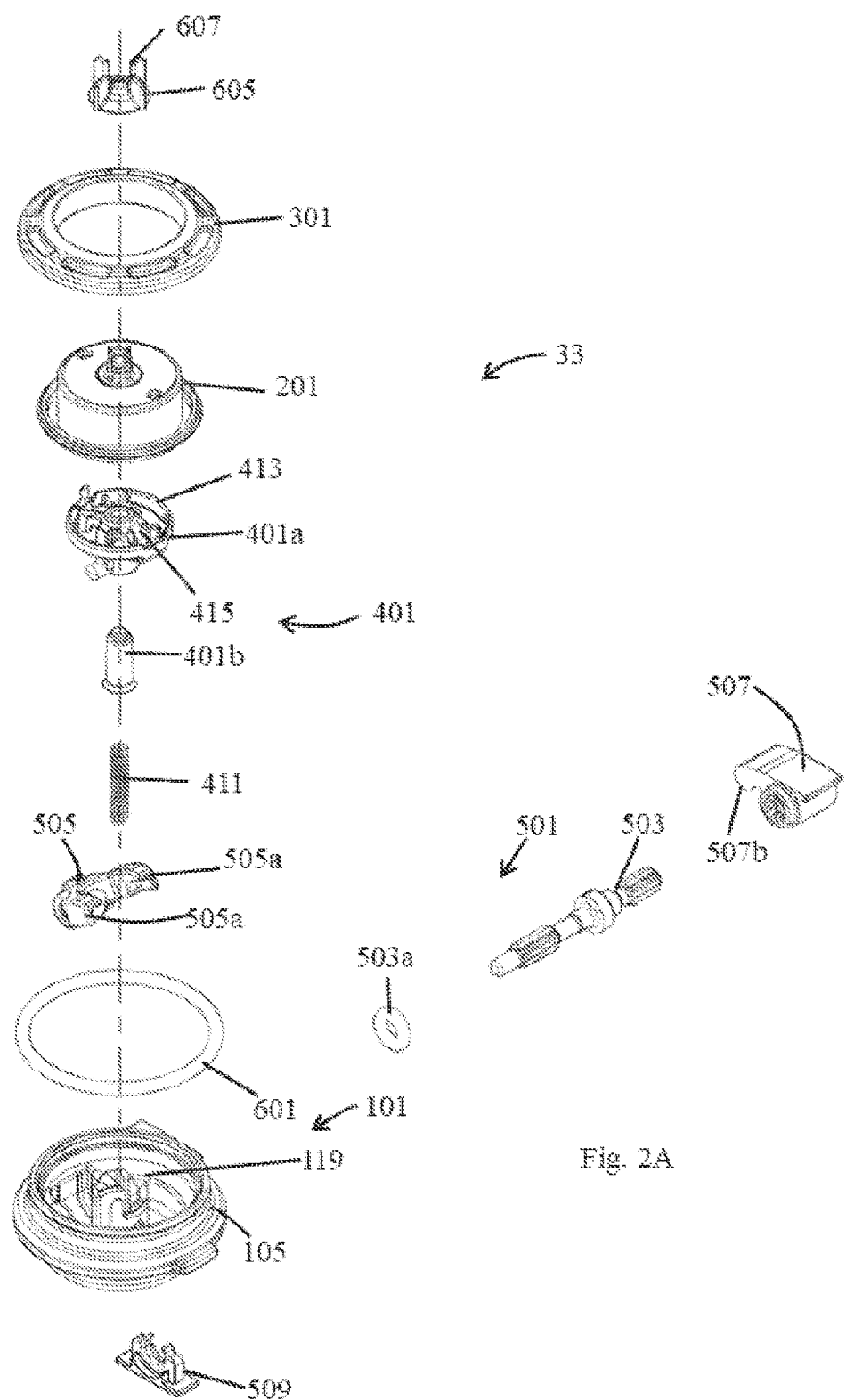
FIG. 2A illustrates a diaphragm valve module from the shower fitting of FIG. 1A in exploded view.
Figure 2B:
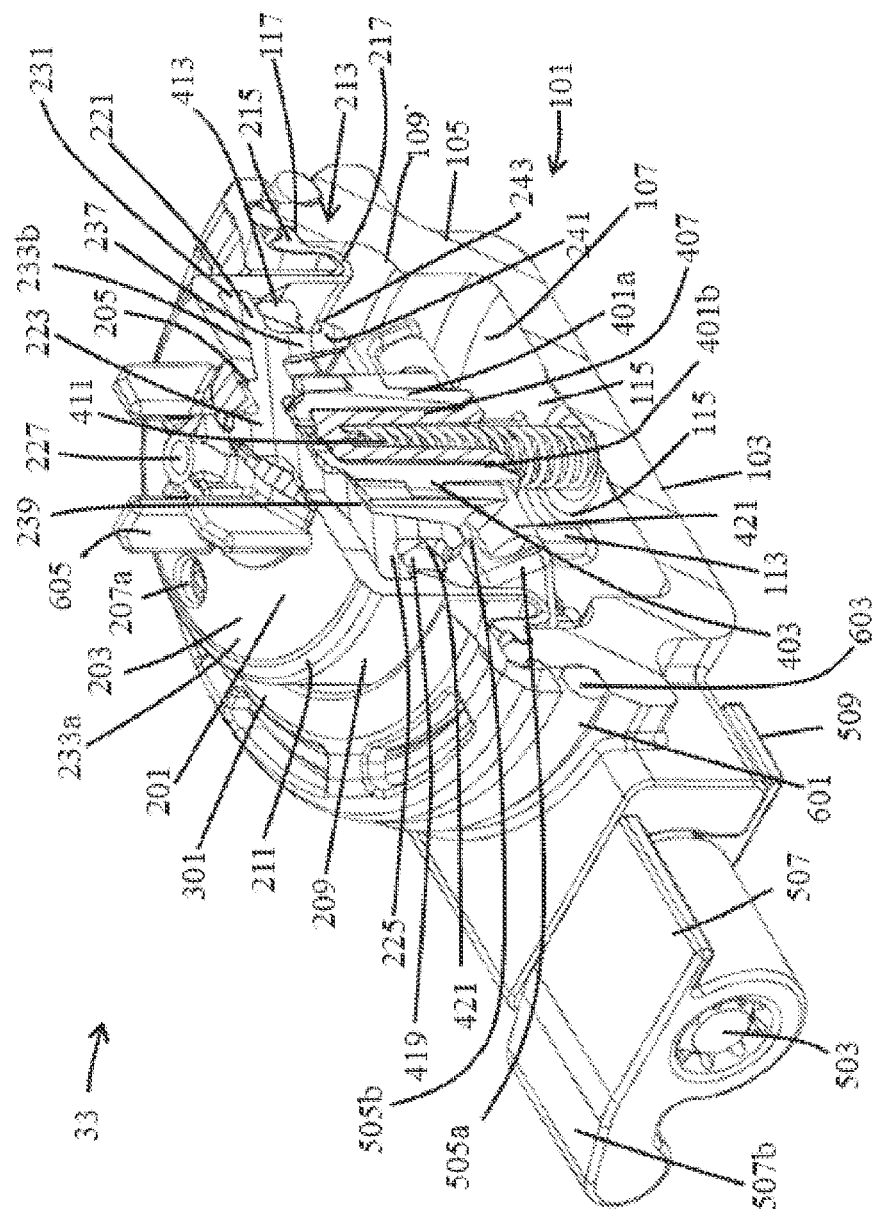
FIG. 2B illustrates the diaphragm valve module of FIG. 2A in cut-through, with the diaphragm in a first position.
Figure 2C:
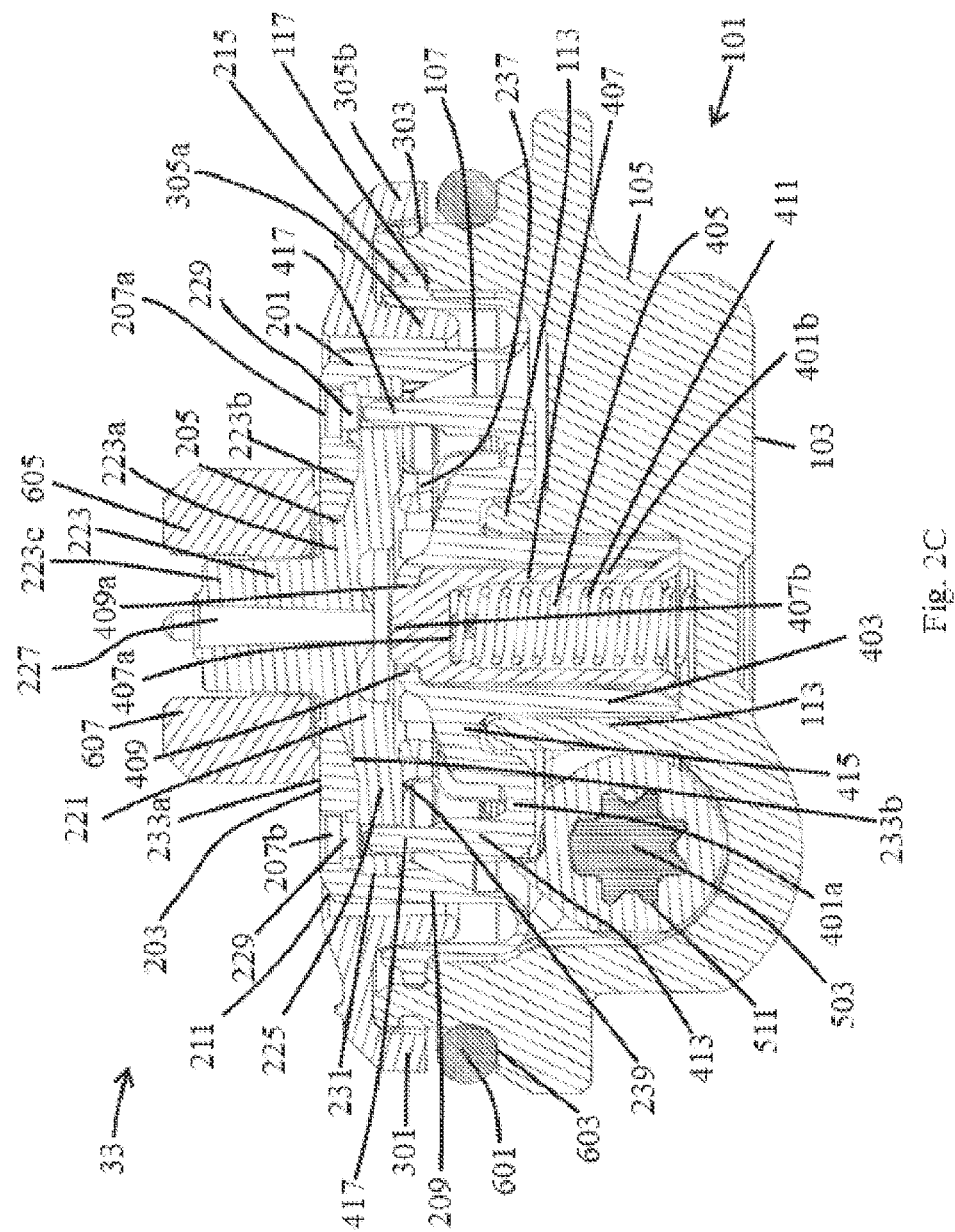
FIG. 2C illustrates the diaphragm valve module of FIG. 2A in cut-through perpendicular to FIG. 2B, with the diaphragm in a second position.
Figure 2D:
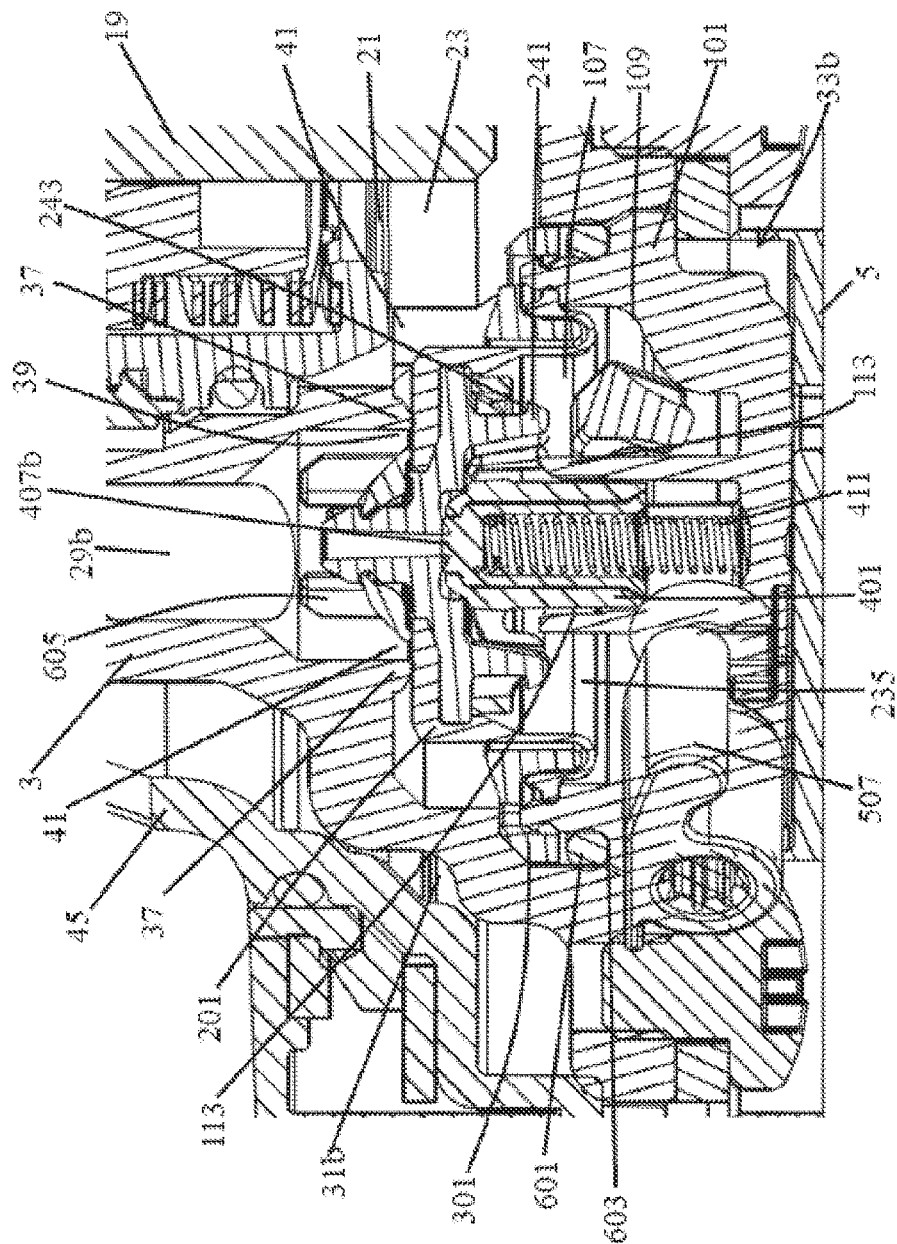
FIG. 2D illustrates the diaphragm valve module of FIG. 2A in the fitting of FIG. 1A in cut-through, with the diaphragm in the first position.

FIG. 2A shows the components of the diaphragm valve module 33 in exploded view, whilst FIGS. 2B and 2C show the assembled diaphragm module 33 in sectional view with the diaphragm in different positions. The views in FIGS. 2B and 2C are taken perpendicular to each other. FIG. 2D shows the diaphragm module 33 installed in the fitting 1 as discussed above, with the diaphragm 201 in the same position as FIG. 2B. It will be appreciated that the two diaphragm valve modules 33a,b are identical in construction, and so only one is described below.

The diaphragm valve module 33 includes a housing 101 having a base 103 and a substantially cylindrical side wall 105 extending upward from the base 103. Together, the base 103 and sidewall 105 define an internal volume 107 of the housing 101.

Within the volume 107, an annular lip 109 is formed partway up the sidewall 105.

An annular projection 113 is formed, extending upward from the base 103 of the housing 101, with a circular void formed within the annular projection 113. The annular projection 113 extends forward within the volume 107, below the height of the sidewall 105. A first pair of slots 115 are formed at diametrically opposed positions on the housing. A second pair of slots (not shown) formed at diametrically opposed positions are also provided, offset from the first pair 115 by 90 degrees around the axial direction X-X. The sectional view of FIG. 2C is taken perpendicular to the slots 115 shown in FIG. 2B.

A second annular lip 117 is formed at the top of the sidewall 105 of the housing 101.

Figure 3:
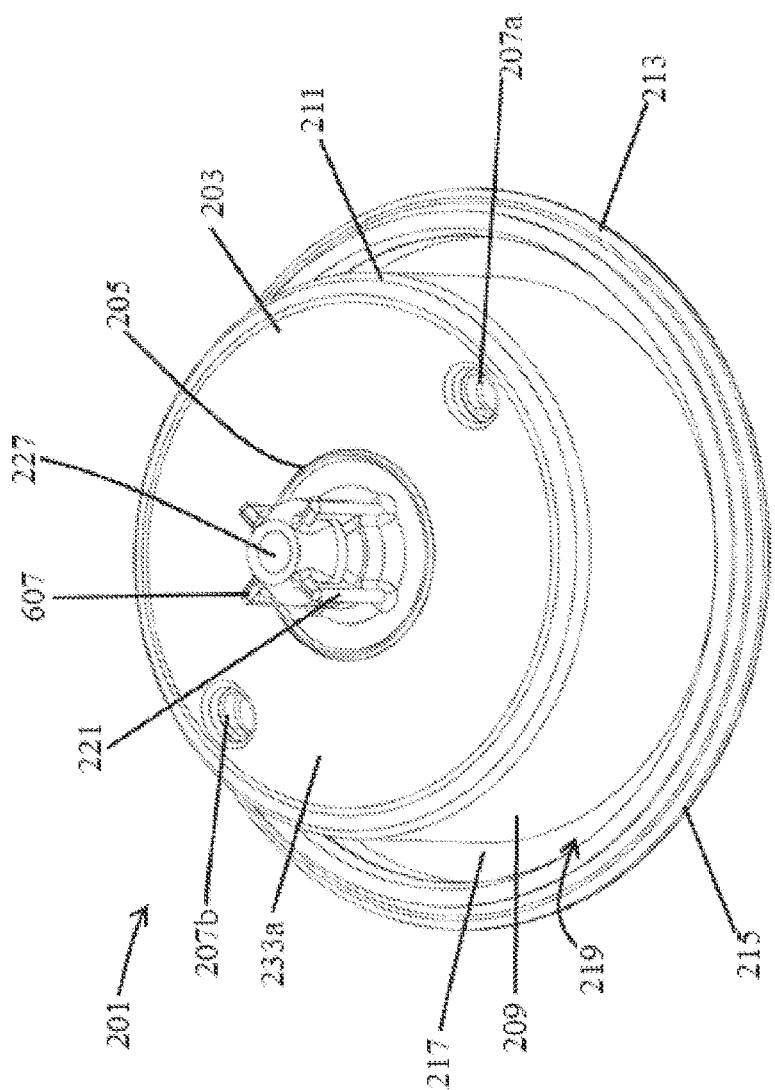
FIG. 3 illustrates the diaphragm of the diaphragm valve module.

A diaphragm 201 is partially received in the volume 107 formed by the housing 101. FIG. 3 shows the diaphragm 201 in more detail.

In the current example, the diaphragm 201 is formed of a rubber material. For example, the diaphragm may be ethylene propylene diene monomer (EPDM) or any other suitable rubber material. Alternatively, the diaphragm 201 may be silicone or any other suitable elastomeric and resilient material.

The diaphragm 201 has a front engaging surface 203. The front engaging surface 203 is flat and circular, and defines an axial direction of the diaphragm that extends perpendicular to the engaging surface 203. In the assembled diaphragm valve module 33, the axial direction of the diaphragm is parallel to the axial direction X-X of the fitting 1.

A central aperture 205 is formed in the engaging surface 203, and a pair of outer apertures 207a,b are formed at diametrically opposed positions, radially outside the central aperture 205.

A cylindrical side wall 209 extends backwards from the outer edge 211 of the engaging surface 203, along the axial direction. At the bottom of the sidewall 209, opposite the engaging surface 203, an enlarged retaining lip 213 is formed.

The retaining lip 213 is formed by a projection 215 extending forward, parallel to the sidewall 209, spaced radially outside the sidewall 209. The projection 215 is connected to the sidewall 209 by a connection portion 217. The projection 215, sidewall 209 and connection portion 217 therefore define a trough 219, as shown in FIG. 3.

The diaphragm 201 is also coupled to a carrier member 221. The carrier member 221 is formed of rigid plastic material. For example, the carrier member may be Polyphthalamide. The carrier member 221 is overmoulded onto the diaphragm 201 to form a sealing connection with the diaphragm 201. Where overmoulding is used, the material of the diaphragm 201 and carrier member 221 should be compatible with this.

The use of overmoulding is by way of example only, and the carrier member 221 and diaphragm 201 may be joined in any way such that the diaphragm 201 always moves with the carrier member 221, and forms a sealing connection with the diaphragm 201. For example, the carrier member 221 may be secured to the diaphragm by adhesives and/or mechanical connections instead of overmoulding.

The carrier member 221 has a projection 223. The projection has substantially cylindrical portion 223c which projects forward of the diaphragm 201, an enlarged portion 223a received in the central aperture 205 of the diaphragm 201, and a flared portion 223b received below the diaphragm 201. A central bleed hole 227 is formed extending through the projection 223.

An annular disc 225 is formed extending from the flared base 223b of the projection 223. The disc 225 underlies the engaging surface 203 of the diaphragm 201, to support the engaging surface 203.

An annular wall projection 237 extends downwardly from the underside 239 of the disc 225. The wall projection 237 is radially spaced between the projection 223 and the outer edge 231 of the disc 225.

As shown in FIGS. 2B and 2D, at the base of the wall projection 237, an enlarged rim 241 is formed, extending radially outward from the wall 237. The enlarged rim 241 forms a ledge 243 on the radially outer surface of the wall projection 237. It will be appreciated that the enlarged rim 241 and ledge 243 may extend around the full circumference of the wall 237, or may extend in one or more separate sections around part of the circumference.

As best shown in FIG. 2C, the carrier member 221 includes apertures 229 aligned with the outer holes 207a,b in the diaphragm.

In the assembled diaphragm valve module 33, the diaphragm 201 is retained relative to the housing 101 by the engagement of the retaining ring 301. The retaining ring 301 is an annular ring that engages with projections 303 (in one example screw threads, but this need not necessarily be the case) at the top of the sidewall 105 of the housing 101.

As best shown in FIG. 2C, the retaining lip 213 of the diaphragm 201 is secured between the second annular lip 117 at the top of the housing sidewall 105, and the retaining ring 301. The retaining ring comprises downward projections 305a,b extending downward form the ring 301. The projections 305a,b are annular, and extend wither side of the second annular lip 117 at the top of the housing sidewall 105 and retaining lip 213 of the diaphragm 201. The retaining ring 301 compresses the retaining lip 213 of the diaphragm diametrically, to form a seal between the diaphragm 201 and the housing 101, such that no water can flow around the diaphragm 201 (i.e. the only flow path is through the bleed holes 207).

The diaphragm 201 is able to deform or move such that the engaging surface 203 can be considered to move over a range between two extreme positions, as shown in FIGS. 2B and 2C.

In the first position, shown in FIGS. 2B and 2D, the diaphragm 201 extends forward out of the housing 101, such that the majority of the sidewall 209 of the diaphragm 201 is outside the housing volume 107. The underside of the carrier member 221 is spaced from the top of the annular projection 113 formed at the front of the housing 105, and the diaphragm 201 is spaced form the first lip 109 in the housing 205.

In the second position, shown in FIG. 2C, the sidewall 209 of the diaphragm 201 is mostly received in the volume 107 defined by the module housing 101. The connection portion 217 of the diaphragm 201 has moved axially towards first lip 109 in the housing 101, and the underside of the carrier member 221 is resting on the top of the annular projection 113.

In order to cause movement of the diaphragm 201 between the two positions discussed above, the central bleed hole 227 in the carrier 221 can be opened and closed. Opening and closing the bleed hole 227 opens and closes a bleed path, which in turn varies the dynamic pressure on the opposing sides 233a,b of the diaphragm 201, as will be discussed in more detail below. The central bleed hole 227 may therefore be considered a control bleed hole.

When open, the bleed path extends from the first (top) side 233a of the diaphragm 201, through the outer bleed holes 207 to the second (bottom) side 233b, into a chamber 235 defined between the diaphragm 201, and the housing 101. The water then flows from the chamber 235 through the central opening 227 in the carrier 221. It will be seen that when the diaphragm 201 is in the first position, the chamber 107 is larger than when the diaphragm 201 is in the second position.

To open and close the central bleed hole 227, a closing member 401 is provided. The closing member 401 is formed of two parts—an outer jacket 401a and a central sleeve 401b.

The outer jacket 401a has a hollow cylindrical portion 403 that is received within the space defined by the annular projection 113 extending from the base 103 of the housing 101. The cylindrical portion 403 of the outer jacket 401 has a partially closed top 409, with a central opening 409a formed therein An annular rim 413 is formed radially outside the cylindrical portion 403. The annular rim 413 is connected by a support structure 415. As shown in FIG. 2C, the support structure 415 may extend from the top of the cylindrical portion 403, with the rim 413 slightly lower. Thus the support structure defines a downward facing recess which can sit on the top of the annular projection 113 in the second position.

An enlarged projection 419 formed at the top of the annular rim 403, forming a ledge 421 on the radially inner side of the rim 413. It will be appreciated that the enlarged projection 419 and ledge 421 may extend around the full circumference of the rim 403, or may extend in one or more separate sections around part of the circumference, circumferentially aligned with the ledge 241 on the carrier member 221.

At diametrically opposed positions, pin formations 417 extend upward from the annular rim 403. The pin formations 417 are positioned to align with the outer holes 407 in the diaphragm 201. In the first position (FIG. 2B), the pin formations 417 extend partway into the holes 229 formed in the carrier 221. In the second position the pin formations 417 extend into the holes 229 in the carrier member 221 and the outer holes 207 in the diaphragm 201, The pin formations 417 are of smaller diameter than the holes 229 in the carrier 221, such that an annular space is always formed around the outside of the pin formations 417, and the holes 229 are never fully closed off.

The central sleeve 401b also includes a hollow cylindrical portion 407. The hollow cylindrical portion 407 of the central sleeve 401b is sized to fit within the cylindrical portion 403 of the outer jacket 401a, forming a tight fit.

The central sleeve has a closed top 407a, and a cylindrical closing projection 407b extending upward from the closed top 407a. The closing projection 407b extends forward through the central opening 409a in the cylindrical portion 403 of the outer jacket 401a, whilst the cylindrical portion 407 of the sleeve member 401b is retained by the partially closed top 409 of the outer jacket 401a The closing projection 407b is able to close the central bleed hole 227. In order to form a sealing closure, the sleeve member 401 is formed from rubber, silicone or some other resilient and elastomeric material. On the other hand, the outer jacket member 401a is formed from a rigid plastic.

In this example, the outer jacket member 401a and central sleeve 401b are formed as two separate parts that are connected by the tight fit of the sleeve 401b inside the jacket 401a, and by the partially closed top 409 of the jacket member 401a. However, this may not necessarily be the case. The two parts may be joined by adhesive, or other suitable means, and they may be made as a single unitary member or more than two parts made of a single material or multiple materials, and joined in any suitable way.

A spring 411 is received in the central volume 405 of the closing member body 403, and is guided within the annular projection 113. The spring 411 engages the inside of the closed top 407a of the sleeve member 401b, and the base 103 of the housing 101, to bias the closing member 401 to a position in which the central bleed hole 227 is closed by the closing projection 407.

The closing member 403 can be moved against the biasing of the spring 409, to open the central bleed hole 227. The diaphragm valve module 33 incorporates a mechanical mechanism 501 for converting a user input from one of the control devices 35*a,b* into movement of the closing member 401.

The mechanism 501 includes an elongate member 503, arranged to rotate about its own axis. The elongate member 503 extends through an opening 119 formed in the housing 101, such that its axis extends perpendicular to the direction of movement of the closing member 401 (and hence the diaphragm 201). An O-ring 503*a* ensures a tight seal between the elongate member 503 and the housing 101, whilst allowing the elongate member 503 to freely rotate.

Inside the housing 101 at a first end of the elongate member 503, a first formation, in this case a fork member 505 is formed on the end of the elongate member 503. The fork member 505 has a pair of spaced projections 505*a* extending radially from the elongate member 503, each having a downward facing surface 505*b*.

The downward facing surfaces 505*b* of the fork projections 505*a* engage with the tops of lugs 421 extending form the cylindrical portion 403 of the outer jacket 401*a* of the closing member 401. The lugs 421 are formed at diametrically opposed positions, extending radially out through the first pair of slots 115 in the annular projection 113. The first pair of slots are formed along an axis that extends parallel to the elongate member 503 in the assembled module 33.

At the second end of the elongate member 503, opposite the first end, a second formation, in this case a paddle member 507 is formed. The paddle member 507 has a surface 507*b* extending out from the elongate member 503. The surface 507*b* is radial or tangential to the elongate member 503. In the example shown, the paddle surface 507*b* extends from substantially the opposite side of the elongate member to the fork projections 505*a*. In other examples, the relative angle between the paddle surface 507*b* and the fork projections 505*a* can be varied, to allow variation in the positioning of the actuator mechanism that exerts a force on the paddle member 507.

The arrangement of the paddle member 507 and fork member 505 allows any pushing or pulling force on the paddle member 50 to be converted to rotation of the elongate member 503, which in turn is converted to rotation of the forks 505, which engage the lugs 421 and cause linear movement of the carrier member 401.

Rotation of the elongate member 503 in a first direction causes rotation of the forks 505 in the same direction, applying a force to the carrier member 401 against the spring 411. Rotation in the opposite direction releases the force, to allow the spring 411 to return the closing member to its biased position. In the example shown, starting from the position in FIG. 2B (closed) a pulling force on the paddle surface 507*b* (i.e. pushing the paddle 507 up) would cause the clockwise rotation of the elongate member 303, lowering the fork projections 505*a* to open the diaphragm valve 33, and a pushing force on the paddle surface 507*b* causes an anti-clockwise rotation, lifting the fork projections 505*b* and closing the valve 33.

In one example, the opening 119 through which the elongate member 503 passes into the housing has an open base, for ease of installation of the elongate member 503. The elongate member 503 is retained in position in the housing 101 by retaining member 509 that closes the base of the opening 119. The retaining member 509 can be secured to the housing 105 or elongate member 503 by friction fit or clip fit, and may form a seat to retain the O-ring 503*a*. In other examples, a simple through hole may be used.

The fork member 505 and paddle member 507 are formed separately to the elongate member 503, and are coupled to the elongate member 503 by engaging projections 511, so that the connection is rigid. In the example shown, the ends of the elongate member 503 are formed with ridges 511 extending parallel to the length of the elongate member, with a number of ridges arranged around the circumference. Each of the fork member 505 and paddle member 507 have sleeves arranged to fit of the ends of the elongate member 503, with corresponding projections 511 to engage the ridges 511.

It will be appreciated that the engagement of the fork member 505 and paddle member 507 with the elongate member 503 is by way of example only, and any suitable mating mechanism may be used, or the fork member 505 and/or paddle member 507 may be formed integrally with the elongate member 503. Furthermore, the fork member 505 and paddle member 507 are just example of formations that can be used. Any suitable formations that can transfer the forces in an appropriate manner may be used.

By using the mechanical mechanism 501 discussed above, the actuation action is introduced from the side of the diaphragm 201 rather than in a linear direction along the same axis as the closing member 401 and diaphragm 201 move. The use of rotation allows the transmission of low forces to open and close the valve, and the force needed is kept substantially constant regardless of the water pressure from the supply. Furthermore, the positioning of the actuation from the side allows variation in the positioning and design of the user control devices 35*a,b* and the mechanism for transferring input from the user control devices 35*a,b* to the valves 33*a,b*.

A retaining nut 605 is provided on top of the valve module 33 to retain the components relative to each other (and optionally help form sealing connections between the diaphragm 201 and carrier member 221 if necessary). The retaining nut 605 is arranged around the outside of the cylindrical projection 223 of the carrier member 221, and the nut 605 and cylindrical projection 223 have engaging formations 607 to secure the nut 605 in place. The formations 607 provide guides to keep the diaphragm central and square against side loads exerted by the water flow.

The retaining nut 605 includes a central passage 607

In use, the diaphragm module 33*a,b* is provided in the valve chamber 31*a,b*. An O-ring 601 is provided in a seat 603 formed in the outer part of the housing 101 to seal around the module 33, between the module 33 and the fitting housing 3*a*. The engaging surface 203 of the diaphragm 201 is perpendicular to the axial direction X-X.

The housing 101 includes annular internal walls or formations 37 defining a mouth 39 to the respective outlet passage 29*a,b*. The size of the mouth 39 is defined so that the central bleed hole 227 is radially within the mouth 39, and the outer bleed holes 207 are radially outside the mouth 39. The space radially outside the mouth 39 is in fluid communication with the outlet chamber 23 from the thermostatic cartridge 19. Therefore the mouth 39 defines an outlet 41 of the valve module 33 radially inside an inlet 43 of the valve module 33.

Starting with the diaphragm 201 in the first position, as shown in FIGS. 2B and 2D: the engaging surface 203 sealingly engages the mouth 39, closing the valve inlet 43 from the valve outlet 41; the outer jacket 401*b* of the closing member 401 abuts the underside 239 of the diaphragm carrier 221 (at the rim 413) and is spaced from the top of the annular projection 113; the pin formations 417 extend through the holes 229 in the carrier member 221 and into the outer holes 207 in the diaphragm 201; and the ledge 243 on the wall projection 237 of the carrier member 221 is linearly spaced from the ledge 419 on the rim 413 of the closing member 401, along the axial direction.

In this position, the closing member 407b sealingly engages the underside of the cylindrical projection 223 to close the central bleed hole 227. Therefore, there is no fluid communication between the inlet 43 and outlet 41 of the valve 33.

A mechanical force can then be applied to the closing member to move it downward, against the biasing of the spring 411.

Initially, the diaphragm 201 does not move, but the closing member 401 moves downwards. After the closing member 401 has moved downwards a first distance, the central bleed hole 227 has been opened. At this stage, the only fluid communication path through valve 33 is the bleed path, from the inlet 43, through outer bleed holes 207 and then the central bleed hole 227 to the outlet 41. This reduces the pressure underneath the diaphragm 201, and increases the pressure above it.

After the closing member 401 has moved down the first distance, then the ledges 243, 419 on the carrier member 221 and closing member 401 engage. However, the underside 239 of the carrier member 221 is not yet in engagement with the annular projection 113, therefore, there is still travel for the closing member 401 to move.

Due to the engagement of the ledges 243, 419, the diaphragm 201 and carrier member 221 move as a single unit with the closing member 401. Therefore, further movement of the closing member 401 does not change the position of the closing projection 417 with respect to the diaphragm 221 and carrier member. Instead, further movement of the closing member 401 applies a mechanical force to the diaphragm 201, moving the diaphragm 201 until it reaches the second position. This further increases the pressure above the diaphragm 201.

Therefore, the diaphragm 201 is moved by a combination of the water pressure differential caused by opening the bleed path and the mechanical force applied by the closing member 401.

In the second position, as shown in FIG. 2C: the engaging surface 203 is spaced from the mouth 39, so the valve inlet 43 is in fluid communication with the valve outlet 41; the outer jacket 401b of the closing member 401 is spaced from the underside 239 of carrier member 221, and abuts the top of the annular projection 113 (at the support structure 415 connecting the rim 413 to the central cylindrical portion 403);

the pin formations 417 extend partway into the holes 229 formed in the carrier 221, but not into the outer holes 207 in the diaphragm 201; and the ledge 243 on the wall projection 237 of the carrier member 221 abuts the ledge 419 on the rim 413 of the closing member 401.

In this position, the central bleed hole 227 is also still open, opening the bleed path.

Releasing the force holding the closing member 401 against the biasing of the spring 411 causes the spring 411 to push the closing member 401 upwards.

Over the first distance, the closing member 401 moves on its own, because the ledges 243, 419 are able to move away from each other in the upwards direction. After the closing member has moved this first distance, the closing projection 407b closes the central bleed hole 227 and the closing member 401 abuts the underside of the carrier member 221. However, the diaphragm 201 is not in engagement with the mouth 39, and still has further travel, and so after this first distance, the diaphragm 201 and closing member 401 move as a single unit again, and so the diaphragm 201 is now moved by a combination of the water pressure differential caused by closing the bleed path and the mechanical force applied by the spring 411. Therefore, the diaphragm 201 is returned to the first position, isolating the valve inlet 43 from the valve outlet 41.

By the mechanism discussed above, the central bleed hole 227 and the valve 33a,b is opened and closed. Furthermore, the movement of the pin formations 417 relative to the diaphragm 201 and carrier member 221 ensures that any blockages that may form in the outer holes 207 are kept clear. Thus the pin formations can be considered an anti-clogging mechanism.

FIGS. 4A and 4B schematically illustrate one example of an actuator mechanism 701 for passing a force from a user control device 35 to the paddle 507 of the mechanical mechanism 501. By using the diaphragm valve 33 discussed above, a low force input can be used. In some cases, an input force of only 5 to 6 Newtons may be required to open the valve 33.

In this example, the actuator mechanism 701 elongates a flexible elongate member 703 extending between the control 35 and the paddle 507. The use of the flexible member 703 allows freedom to position the control with respect to the valve module 33, as the elongate member 703 can follow a non-straight path.

As shown in FIG. 4B, which shows a cross-section taken through the flexible elongate member 703, the flexible elongate member includes an outer sheath 705 and an inner cable or tube 707. The outer sheath 705 is rigidly secured to the support structure of the fitting 1, allowing the inner member 707 to move in a direction along its length. A first end of the inner member 707 is secured to the control 35, and a second end is rigidly secured to the paddle. Therefore, movement of the inner member 707, caused by actuation of the control 35, actuates the paddle 507.

In one example, the user control may be a button, but any suitable control may be used.

It will be appreciated that in order to hold the diaphragm valve 33 open, it is necessary to maintain the force on the closing member 401 against the spring 411. This may be achieved by latching of any one or more of the user control device 35, the cable 707, or the mechanical mechanism 501. Suitable latching mechanisms are known in the art.

In the examples discussed above, the inner member 707 of the actuator mechanism is secured directly to the paddle member 507. This need not necessarily be the case, and a link member 801 may be provided between the inner member 707 and the paddle member 507. In one example, such as shown in FIG. 4C, the link member 801 may be a arranged as a lever. The inner member 707 of the elongate member 703 is connected to a first end 803a of the lever 801, and the second end 803b of the lever 801 is arranged to push up and/or down on the paddle 507.

The pivot point 805 of the lever 801 can be moved to help apply a lever effect such that a low force input from a user can be stepped up to operate the valve 33. It will be appreciated that the pivot 805 and lever 801 may be retained in suitable formations provided in the plate 5 or on the housing 3.

It will be appreciated that the embodiments discussed above are given by way of example only.

For example, various different mechanisms may be provided to use a mechanical force to cause movement of a diaphragm 201 over at least part of its range, in combination with a pressure differential.

In the example discussed above, the retaining lip 213 of the diaphragm is held stationary, whilst the central part of the diaphragm 201 moves, with reinforcing from a carrier. It will be appreciated that in other embodiments, the whole diaphragm 201 may move and/or deform in any suitable way to open and close a valve.

The diaphragm 201 given above is by way of example only. Any suitable shape and arrangement of diaphragm 201 may be used. The central aperture 227 in the diaphragm 201 or carrier member 221 may be replaced by a number of separate apertures. Similarly, the portion of the flow path provided by the additional apertures 207 may be provided by any number of and size of aperture to provide the bleed path.

Alternatively, at least part of the bleed path may be provided through a passage formed in the housing 101, rather than through apertures in the diaphragm 201. This may be either the portion of the bleed path formed by the central aperture 227 or the outer apertures 207.

In the example discussed above, the diaphragm 201 is biased to close the valve. This is by way of example, and the diaphragm 201 may be biased to open the valve. Whether the diaphragm 201 is biased to open or close the valve, any suitable biasing means may be used, instead of a spring.

The formation of the housing 101 to hold the diaphragm module 33, and the projections 113, used to guide the movement of the closing member is provided by example only, any suitable construction may be used.

In one example, the diaphragm valve 33 may be formed integrally with the fitting 1, rather than being provided as a separate module.

The valve module 33 can be used with any type of user control device 35a,b, and with any type of actuator mechanism 701 for connecting the user control device 35a,b to the valve module 33a,b. Similarly, any suitable mechanical mechanism can be used to drive movement of the closing member 401.

It will be appreciated that the actuator mechanism 701 discussed above is given by example only, and any suitable mechanism may be used. For example, any suitable inner member 707 or sheath 705 may be used. In the example discussed above, the inner member 707 is entirely encased within the sheath 705, but this need not necessarily be the case, and the sheath 705 may simply guide the inner member 707 as required. In some example, a rigid connection may be provided between the user control 35a,b and the paddle member 507 instead of the flexible member discussed above.

It will also be appreciated that the arrangement of the fixing 1 is given by way of example only. The inlet and outlet of the diaphragm module 33 may be on either side of the diaphragm 201, and may be on the same or opposite sides of the diaphragm 201.

The diaphragm valve may include an anti-clogging means to prevent blockages forming in the additional bleed holes.

The diaphragm valve may include a latch arranged to hold the diaphragm in the first and/or second position.

The diaphragm valve may include a housing defining a volume at least partially receiving the diaphragm, the closing member, and the rotatable elongate member.

The diaphragm valve may include an aperture formed centrally in the diaphragm.

The diaphragm valve may include a closing member biased to close the control bleed hole.

Although the above embodiments have been described in relation to a shower with an overhead showerhead, and a handheld unit, the valve may be used in any ablutionary fitting with one or more inlet and one or more outlet device.

Not all the outlet devices are necessarily controlled by the same type of valve. Any type of mixer cartridge may be used and in some embodiments, the mixer may be omitted altogether.

The invention claimed is:

1. A diaphragm valve comprising:
   a diaphragm moveable over a range from a first position to a second position, to open and close an outlet;
   a control bleed hole extending from a first side of the diaphragm to a second side, opposite the first side;
   a closing member moveable to open and close the control bleed hole, to modify pressure on either side of the diaphragm, to cause the movement the diaphragm over at least part of the range along a linear direction; and
   an elongate member having an axis extending perpendicular to a direction of movement of the closing member, wherein when the elongate member rotates about the axis, the closing member is configured to open and close the control bleed hole,
   wherein the elongate member engages the diaphragm and causes movement of the diaphragm over at least part of the range.

2. The diaphragm valve of claim 1, wherein the elongate member engages the diaphragm after moving the closing member to open or close the control bleed hole.

3. The diaphragm valve of claim 1, wherein over at least part of the range, movement of the diaphragm is driven by a combination of the elongate member and a pressure difference of the pressure on either side of the diaphragm.

4. The diaphragm valve of claim 1, wherein the control bleed hole is formed as an aperture in the diaphragm.

5. The diaphragm valve of claim 1, comprising an inlet and an outlet fluidly isolated from the inlet when the diaphragm is in the first position, wherein the inlet and outlet are both on the first side of the diaphragm.

6. The diaphragm valve of claim 5, wherein the diaphragm comprises one or more additional bleed holes extending through the diaphragm, separate from the control bleed hole, the one or more additional bleed holes in fluid communication with the inlet and fluidly isolated from the outlet when the diaphragm is in the first position, such that a bleed path is formed when the control bleed hole is open, the bleed path extending from the inlet, through the one or more additional bleed holes to the second side of the diaphragm, and from the second side of the diaphragm to the outlet through the control bleed hole.

7. The diaphragm valve of claim 5, wherein the inlet and outlet are in direct fluid communication when the diaphragm is in the second position, providing a flow path from the inlet to the outlet.

8. The diaphragm valve of claim 1, wherein the elongate member converts a pushing and/or pulling force from an actuator mechanism to a movement of the closing member.

9. The diaphragm valve of claim 8, wherein the closing member is arranged to move along the linear direction, and wherein the elongate member converts rotation of the elongate member to linear movement of the closing member.

10. The diaphragm valve of claim 9, wherein the elongate member converts a linear movement of the actuator mechanism to rotation of the elongate member.

11. The diaphragm valve of claim 8, wherein the actuator mechanism is arranged to translate an input force at a user control device to a movement of the actuator mechanism along its length.

12. The diaphragm valve of claim 8, wherein the actuator mechanism comprises:

a cable or flexible tube coupled between a user control device and the elongate member; and
a sheath at least partially encasing and guiding the cable or flexible tube,
wherein the cable or flexible tube is moveable relative to the sheath in a direction along the length of the cable or flexible tube and a pushing or pulling force from either end of the cable or flexible tube is translated along the length of the cable or flexible tube.

13. The diaphragm valve of claim 1, wherein the elongate member includes:
a first formation on the elongate member engaging an actuator mechanism and configured to convert linear movement of the actuator mechanism to rotation of the elongate member; and
a second formation engaging the closing member and configured to convert rotation of the elongate member to linear movement of the closing member.

14. The diaphragm valve of claim 1, comprising a housing defining a volume at least partially receiving the diaphragm, the closing member and the elongate member, wherein the housing defines a seat defining the first and/or second position of the diaphragm.

15. The diaphragm valve of claim 14, wherein the diaphragm closes the volume, to form an enclosed space on the second side of the diaphragm.

16. The diaphragm valve of claim 15,
comprising an inlet and an outlet fluidly isolated from the inlet when the diaphragm is in the first position, wherein the inlet and outlet are both on the first side of the diaphragm;
wherein the diaphragm comprises one or more additional bleed holes extending through the diaphragm, separate from the control bleed hole, the one or more additional bleed holes in fluid communication with the inlet and fluidly isolated from the outlet when the diaphragm is in the first position, such that a bleed path is formed when the control bleed hole is open, the bleed path extending from the inlet, through the one or more additional bleed holes to the second side of the diaphragm, and from the second side of the diaphragm to the outlet through the control bleed hole;
wherein the bleed path passes through the enclosed space.

17. The diaphragm valve of claim 16, comprising a retaining ring to retain the diaphragm at least partially within the enclosed space, and to at least partially define the first and/or second position of the diaphragm.

18. An ablutionary fitting comprising:
a body;
one or more inlets; and
one or more outlets, at least one of the one or more outlets having a diaphragm valve arranged to open and close the outlet, the diaphragm valve comprising:
a diaphragm moveable over a range from a first position to a second position, to open and close an outlet;
a selectively closeable control bleed hole extending from a first side of the diaphragm to a second side, opposite the first side, wherein opening and closing the control bleed hole modifies pressure on either side of the diaphragm to cause the movement the diaphragm over at least part of the range; and
an elongate member having an axis extending perpendicular to a direction of movement of the closing member, wherein when the elongate member rotates about its axis, a closing member is configured to cause opening and closing of the control bleed hole,
wherein the elongate member engages the diaphragm and causes movement of the diaphragm over at least part of the range.

19. The ablutionary fitting of claim 18, wherein a housing comprises internal formations defining the inlet of the diaphragm valve and the outlet of the diaphragm valve.

20. A diaphragm valve comprising:
a diaphragm moveable over a range from a first position to a second position, to open and close an outlet;
a control bleed hole extending from a first side of the diaphragm to a second side, opposite the first side;
a closing member moveable to open and close the control bleed hole, to modify pressure on either side of the diaphragm, to cause the movement the diaphragm over at least part of the range; and
an elongate member having an axis extending perpendicular to a direction of movement of the closing member, wherein when the elongate member rotates about the axis, the closing member is configured to open and close the control bleed hole, the elongate member including:
a first formation engaging an actuator mechanism and configured to convert linear movement of the actuator mechanism to rotation of the elongate member; and
a second formation engaging the closing member and configured to convert rotation of the elongate member to linear movement of the closing member;
wherein over at least part of the range, movement of the diaphragm is driven by a combination of the elongate member and a pressure difference of the pressure on either side of the diaphragm.

* * * * *